United States Patent [19]

Oka et al.

[11] Patent Number: 5,532,325
[45] Date of Patent: Jul. 2, 1996

[54] PROCESS FOR PRODUCING HIGH STIFFNESS POLYPROPYLENE

[75] Inventors: Takahiro Oka; Hiromasa Chiba, both of Chiba, Japan

[73] Assignee: Chisso Corporation, Osaka, Japan

[21] Appl. No.: 545,232

[22] Filed: Oct. 19, 1995

Related U.S. Application Data

[63] Continuation of Ser. No. 679,834, Apr. 1, 1991, abandoned, which is a continuation of Ser. No. 331,368, Mar. 31, 1989, abandoned.

[30] Foreign Application Priority Data

Apr. 4, 1988 [JP] Japan ................ 63-82597

[51] Int. Cl.$^6$ .................. C08F 4/655; C08F 10/06
[52] U.S. Cl. .................. 526/79; 526/86; 526/142; 526/351
[58] Field of Search .................. 526/79, 86

[56] References Cited

U.S. PATENT DOCUMENTS

| | | | |
|---|---|---|---|
| 4,499,247 | 2/1985 | Chiba et al. | 526/142 |
| 4,582,878 | 4/1986 | Chiba et al. | 525/323 |
| 4,772,661 | 9/1988 | Asanuma et al. | 525/248 |
| 4,978,722 | 12/1990 | Goko et al. | 525/268 |

FOREIGN PATENT DOCUMENTS 2111908  4/1985  United Kingdom .

*Primary Examiner*—Edward J. Smith
*Attorney, Agent, or Firm*—Leydig, Voit & Mayer

[57] ABSTRACT

A process for producing polypropylene is provided which comprises polymerizing propylene in multiple stages, in the presence of a catalyst which is prepared by reacting a first organoaluminum compound (i), or a reaction product (vi) formed between the first organoaluminum compound (i) and an electron donor (a), with titanium tetrachloride (c) to obtain a first solid product (ii), reacting the resulting first solid product (ii) with the electron donor (a) and an electron acceptor (b) to obtain a second solid product (iii), and combining the resulting second solid product (iii) with a second organoaluminum compound (iv) and an aromatic carboxylic acid ester (v) at a molar ratio of the aromatic carboxylic acid ester to the second solid product (v/iii molar ratio) of from 0.1 to 10.0, in such a manner that from 10 to 90% by weight of the total polymer is produced in a first stage and the balance of the total polymer is produced in a second and any subsequent stages with the v/iii molar ratio of the catalyst being made higher in the second and any subsequent stages than that in the catalyst used in the first stage by adding the aromatic carboxylic acid ester (v) to the polymerization system so as to give $1 \leq$ v/iii molar ratio $\leq 10$, while controlling the melt flow rate (MFR) of a polymer portion produced in each of the first and any subsequent stages so as to satisfy the relationships:

$$0.5 < \log(MFR_H/MFR_L) < 5.0 \qquad (1)$$

and $$0.0028 \leq MFR_L \leq 0.4 \qquad (2)$$

wherein $MFR_H$ is the MFR of a polymer portion having the highest MFR and $MFR_L$ is the MFR of a polymer portion having the lowest MFR.

6 Claims, No Drawings

PROCESS FOR PRODUCING HIGH STIFFNESS POLYPROPYLENE

RELATED APPLICATIONS

This application is a continuation of patent application Ser. No. 07/679,834, filed Apr. 1, 1991, now abandoned, which is a continuation of application Ser. No. 07/331,368, filed Mar. 31, 1989, now abandoned.

FIELD OF THE INVENTION

This invention relates to a process for producing polypropylene, and more particularly, to a process for producing polypropylene capable of providing molded articles having high stiffness.

BACKGROUND OF THE INVENTION

Crystalline polypropylene is excellent in heat resistance, chemical resistance, and electrical properties and satisfactory in stiffness, tensile strength, optical characteristics, and post-processability and has thus been used for production of various molded articles such as injection molded articles, blow molded articles, films, and sheets.

However, the crystalline polypropylene is limited in its application because the above-described properties are not always satisfactory as demanded in some applications. In particular, it is inferior to a polystyrene resin or an ABS resin in terms of stiffness properties, which has constituted a serious hindrance to increasing the application of application of the crystalline polypropylene. Accordingly, an improvement in stiffness properties would lead not only to reduction of wall thickness of molded articles which contributes to saving of resources but also to speeding up of cooling of molded articles which contributes an increase of molding rate per unit time, i.e., productivity rate.

It is conventionally known that stiffness of crystalline polypropylene may be improved by incorporating thereinto an organic nucleating agent, e.g., aluminum p-t-butylbenzoate and 1.3,2.4-dibenzylidene sorbitol, or various inorganic fillers, e.g., talc, calcium carbonate, mica, barium sulfate, asbestos, and calcium silicate.

Incorporation of an organic nucleating agent, however, not only results in considerable reduction in surface gloss, impact strength, and tensile elongation of the resulting molded articles but increase cost. Further, incorporation of the inorganic fillers not only which are advantageous characteristics of prolypropylene but also reduces surface gloss, tensile elongation and post-processability of the molded articles.

It has been proposed to obtain molded articles of high stiffness by using polypropylene having high isotacticity as disclosed in JP-A-58-104905, JP-A-58-104906, and JP-A-58-104907 (the term "JP-A" as used herein means an "unexamined published Japanese patent application"). The proposed polypropylene exhibits somewhat improved stiffness but is still unsatisfactory as compared with polystyrene or an ABS resin.

SUMMARY OF THE INVENTION

One object of this invention is to provide a process for producing polypropylene capable of providing a molded article having improved stiffness comparable to polystyrene or an ABS resin without using an organic nucleating agent or inorganic filler.

The inventors have conducted intensive and extensive investigations. As a result, it has now been found that polypropylene providing molded articles having high stiffness can be obtained by polymerizing propylene under specific polymerization conditions. The present invention has been completed based on this finding.

The present invention relates to a process for producing polypropylene which comprises polymerizing propylene in multiple stages in the presence of a catalyst, which is prepared by reacting (i) an organoaluminum compound or (vi) a reaction product formed between the organoaluminum compound (i) and (a) an electron donor with (c) titanium tetrachloride to obtain (ii) a solid product, reacting the resulting solid product (ii) with (a) an electron donor and (b) an electron acceptor to obtain (iii) a solid product, and combining the resulting solid product (iii) with (iv) an organaluminum compound and (v) an aromatic carboxylic acid ester at a molar ratio of the aromatic carboxylic acid ester to the solid product (v/iii molar ratio) of from 0.1 to 10.0, in such a manner that from 10 to 90%, preferably from 20 to 80%, by weight of the total polymer is produced in the first stage and the balance (i.e, from 10 to 90%, preferably from 20 to 80%, by weight) of the total polymer is produced in the second and subsequent stages with the v/iii molar ratio of said catalyst being made higher than that in the catalyst used in the first stage by adding the aromatic carboxylic acid ester (v) to the polymerization system, while controlling a melt flow rate (MFR) of a polymer portion produced in each of the first and the subsequent stages so as to satisfy relationship (1):

$$0.5 < \log (MFR_H/MFR_L) < 5.0 \qquad (1)$$

wherein $MFR_H$ is an MFR of a polymer portion having the highest MFR; and $MFR_L$ is an MFR of a polymer portion having the lowest MFR.

The object of the present invention cannot be achieved if the above-described solid product (iii) used as a catalyst component in the process of this invention is replaced with any titanium trichloride including one obtained by reducing titanium tetrachloride with metallic aluminum or hydrogen (so-called A type or H type) and activated titanium trichorided obtained by pulverizing the A type or H type followed by activation (so-called AA type or HA type) as well as titanium trichoride obtained by heat treatment of titanium tetrachloride on a carrier, e.g., magnesium chloride and titanium trichoride obtained by reducing titanium tetrachloride with an organoaluminum compound followed by heat treatment.

DETAILED DESCRIPTION OF THE INVENTION

The solid product (iii), a catalyst component which can be used in the present invention, is prepared as follows. An organoaluminum compound (i) is reacted with titanium tetrachloride (c); or a reaction product (vi) formed between the organoaluminum compound (i) and (a) an electron donor (a) is reacted with titanium tetrachloride, (c), to prepare the solid product (ii). The latter reaction is preferred to finally obtain a preferred titanium catalyst component.

Details of the latter reaction are described in JP-A-56-110707 (Japanese Patent Application No. 55-12875). In some detail, the reaction between the organoaluminum compound (i) and the electron donor (a) is carried out in a solvent (d) at a temperature of from −20° to 200° C., preferably from −10° to 100° C., for a period of from 30 seconds to 5 hours, preferably from 15 minutes to 3 hours. The order of addition of the components (i), (a), and (d) is not limited. The electron donor (a) is used in an amount of from 0.1 to 8 mols, preferably from 1 to 4 mols, per mol of the organoaluminum compound (i). The solvent (d) is used in an amount of from 0.5 to 5 l, preferably from 0.5 to 2 l, per mol of the organoaluminum compound (i). The solvent to be used preferably includes aliphatic hydrocarbons. The resulting reaction product (vi) can be subjected to the subsequent reaction as obtained in a dissolved state [hereinafter sometimes referred to as a reaction mixture (vi)].

The reaction between the reaction product (vi) and titanium tetrachloride (c) is conducted at a temperature of from 0° to 200° C., preferably from 10° to 90° C., for a period of from 5 minutes to 8 hours, preferably from 30 minutes to 5 hours. The reaction is preferably carried out in the absence of a solvent, but an aliphatic hydrocarbon or an aromatic compound may be used as a solvent, if desired. The order of mixing the components (vi) and (c) and the solvent is arbitrary. It is preferred that the whole amounts of these components be mixed within 5 hours and, after the mixing, the reaction be continued at a temperature of from 10° to 90° C. for 8 hours at the longest. The solvent is used in an amount of from 0 to 3,000 ml, preferably from 50 to 1,000 ml, per mol of titanium tetrachloride. The reaction product (vi) is used in such an amount that the atomic ratio of aluminum in the reaction product (vi) to titanium in the titanium tetrachloride (i.e., Al/Ti atomic ratio) ranges from 0.05 to 10, preferably from 0.06 to 0.2. After completion of the reaction, the liquid portion is removed by filtration or decantation, and the solid is repeatedly washed with a solvent. The resulting solid product (ii) may be used in the subsequent reaction either as obtained in a state suspended in the solvent or in the form of a solid taken up after drying.

The resulting solid product (ii) is then reacted with an electron donator or donor (a) and an electron acceptor (b) to obtain a solid product (iii). The reaction may be carried out in the absence of a solvent, but is preferably effected in the presence of an aliphatic hydrocarbon as a solvent. The electron donor (a) is used in an amount of from 10 to 1,000 g, preferably from 50 to 200 g, per 100 g of the solid product (ii). The electron acceptor (b) is used in an amount of from 10 to 1,000 g, preferably from 20 to 500 g, per 100 g of the solid product (ii). The solvent is used in an amount of from 0 to 3,000 ml, preferably from 100 to 1,000 ml, per 100 g of the solid product (ii). The components (ii), (a), and (b), and if desired, the solvent are mixed at a temperature of from −10° to 40° C., preferably from 0° to 30° C. for a period of from 0 5 to 60 minutes, preferably from 5 to 30 minutes, and allowed to react at a temperature of from 40° to 200° C., preferably from 50° to 100° C., for a period of from 30 seconds to 5 hours, preferably from 10 minutes to 3 hours. The order of mixing the components (ii), (a), and (b), and the solvent is not limited. The electron donor (a) and the electron acceptor (b) may be reacted before being mixed with the solid product (ii). In this case, the components (a) and (b) are reacted at a temperature of from 10° to 100° C., preferably from 20° to 70° C. for a period of from 0.5 to 2 hours, preferably from 1 to 1.5 hours, followed by cooling to 40° C. After completion of the reaction among the solid product (ii), the electron donor (a), and the electron acceptor (b), the reaction mixture is filtered or decanted to remove the liquid portion thereof. The solid is repeatedly washed with a solvent to remove any unreacted liquid raw materials to thereby obtain the solid product (iii). The solid product (iii) may be subjected to the subsequent use either as obtained in a suspended state or in the form of a solid after drying.

The solid product (iii) is then combined with from 0.1 to 500 g, preferably from 0.5 to 50 g, of an organoaluminum compound (vi) per gram of the solid product (iii) and a prescribed amount of an aromatic carboxylic ester (v) to prepare a catalyst for use in the present invention. In a preferred embodiment, a combination of the solid product (iii) and the organoaluminum compound (iv) is reacted with an α-olefin for preactivation and then combined with the aromatic carboxylic ester (v) to obtain a catalyst.

The organoaluminum compound (iv) which can be used in the present invention can be represented by formula $AlR_nR'_{n'}X_{3-(n+n')}$, wherein R and R' each represents a hydrocarbon group, e.g., an alkyl group, an aryl group, an alkylaryl group, and a cycloalkyl group, or an alkoxy group; X represents a halogen atom (e.g., fluorine, chlorine, bromine, and iodine); and n and n' each represents an arbitrary number satisfying relationship $0<n+n'\leq 3$.

Specific examples of the organoaluminum compound of the above formula are trialkylaluminums, e.g., trimethylaluminum, triethylaluminum, tri-n-propyl-aluminum, tri-n-butylaluminum, tri-i-butylaluminum, tri-n-hexylaluminum, tri-i-hexylaluminum, tri-2-methylpentylaluminum, tri-n-octylaluminum, and tri-n-decylaluminum; diethylaluminum monohalides, e.g., diethylaluminum monochloride, di-n-propylaluminum monochloride, di-i-butylaluminum monochloride, diethylaluminum monofluoride, diethylaluminum monobromide, and diethylaluminum monoiodide; and alkylaluminum halides, e.g., methylaluminum sesquichloride, ethylaluminum sesquichloride, ethylaluminum dichloride, and i-butylaluminum dichloride. In addition, alkoxyalkylaluminum, e.g., monoethoxydiethylaluminum and diethoxymonoethylaluminum, can also be used. These organoaluminum compounds may be used either individually or in combination of two or more thereof.

The organoaluminum compound (i) to be used for obtaining the reaction product (vi) and the organoaluminum compound (iv) to be combined with the solid product (iii) may be the same or different.

The electron donor (a) which can be used in the present invention includes various organic compounds containing any of oxygen, nitrogen, sulfur, and phosphorus, i.e., ethers, alcohols, esters, aldehydes, fatty acids, ketones, nitriles, amines, amides, ureas or thioureas, isocyanates, azo compounds, phosphines, phosphites, phosphinites, thioethers, and thioalcohols. Among them, it is preferable to chiefly use ethers in combination with other electron donors. Specific examples of these electron donors are ethers, e.g., diethyl ether, di-n-propyl ether, di-n-butyl ether, diisoamyl ether, di-n-pentyl ether, di-n-hexyl ether, di-i-hexyl ether, di-n-octyl ether, di-i-octyl ether, di-n-dodecyl ether, diphenyl ether, ethylene glycol monomethyl ether, diethylene glycol dimethylether, and tetrahydrofuran; alcohols, e.g., methanol, ethanol, propanol, butanol, pentanol, hexanol, octanol, phenol, cresol, xylenol, ethylphenol, and naphthol; esters, e.g., methyl methacrylate, ethyl acetate, butyl formate, amyl acetate, vinyl butyrate, vinyl acetate, ethyl benzoate, propyl benzoate, butyl benzoate, octyl benzoate, 2-ethylhexyl benzoate, methyl toluylate, ethyl toluylate, 2-ethylhexyl toluylate, methyl anisate, ethyl anisate, propyl anisate, ethyl cinnamate, methyl naphthoate, ethyl naphthoate, propyl naphthoate, butyl naphthoate, 2-ethylhexyl naphthoate, and ethyl phenylacetate; aldehydes, e.g., acetaldehyde and benzaldehyde; fatty acids, e.g., formic acid, acetic acid, propionic acid, butyric acid, oxalic acid, succinic acid, acrylic acid, and maleic acid; aromatic acids, e.g., benzoic acid; ketones, e.g., methyl ethyl ketone, methyl isobutyl ketone, and benzophenone; nitriles, e.g., acetonitrile; amines, e.g., methylamine, diethylamine, tributylamine, triethanolamine, β(N,N-dimethylamino)ethanol, pyridine, quinoline, α-picoline, N,N,N',N'-tetramethylhexaethylenediamine, aniline, and dimethylaniline; amides, e.g., formamide, hexamethylphosphoric triamide, N,N,N' ,N' ,N''-pentamethyl-N'-β-dimethylaminomethylphosphoric triamide, and octamethylpyrophosphoramide; ureas, e.g., N,N,N',N'-tetramethylurea; isocyanates, e.g., phenyl isocyanate and toluyl isocyanate; azo compounds, e.g., azobenzene; phosphines, e.g., ethyl phosphine, triethyl phosphine, tri-n-butyl phosphine, tri-n-octyl phosphine, triphenyl phosphine, and triphenyl phosphine oxide; phosphites, e.g., dimethyl phosphite, di-n-octyl phosphite, triethyl phosphite, tri-n-butyl phosphite, and triphenyl phosphite, phosphinites e.g., ethyldiethyl phosphinite, ethylbutyl phosphinite, and phenyldiphenyl phosphinite; thioethers, e.g., diethyl thioether, diphenylthioether, methyl phenyl thioether, ethylene sulfide, and propylene sulfide; and thioalcohols, e.g., ethyl thioalcohol, n-propyl thioalcohol, and thiophenol. These electron donors may be used either individually or in combination of two or more thereof.

The electron acceptor (b) which can be used in the present invention is represented by halides of the Groups III to VI elements, e.g., aluminum, silicon, tin, titanium, zirconium, phosphorus, vanadium, antimony and hafnium. Specific examples of the electron acceptor are anhydrous aluminum chloride, silicon tetrachloride, stannous chloride, stannic chloride, titanium tetrachloride, zirconium tetrachloride, phosphorus trichloride, phosphorus pentachloride, vanadium tetrachloride, and antimony pentachloride. These electron acceptors may be used either individually or in combination of two or more thereof. The most preferred of them is titanium tetrachloride.

The solvent which can be used in the present invention preferably includes aliphatic hydrocarbons, e.g., n-heptane, n-octane, and i-octane. In place of or in addition to the aliphatic hydrocarbon solvent, a halogenated hydrocarbon, e.g., carbon tetrachloride, chloroform, dichloroethane, trichloroethylene, and tetrachloroethylene, may also be used. The solvent also preferably includes aromatic compound [e.g., aromatic hydrocarbons (e.g., naphthalene) and derivatives thereof such as alkyl- or aryl-substitutes (e.g., mesitylene, durene, ethylbenzene, isopropylbenzene, 2-ethylnaphthalene, 1-phenylnaphthalene) and halides (e.g., monochlorobenzene, orthodichlorobenzene)].

The thus obtained solid product (iii) is then combined with an organoaluminum compound (iv) and an aromatic carboxylic ester hereinafter described and used as it is for polymerization of propylene in a usual manner. In a preferred embodiment, the combination of the solid product (iii) and the organoaluminum compound (iv) is reacted with an α-olefin for preactivation and then combined with an aromatic carboxylic ester (v). The organoaluminum compound (iv) to be used here preferably includes dialkylaluminum monohalides represented by formula $AlR_1R_2X$, wherein $R_1$ and $R_2$ each represents a hydrocarbon group, e.g., an alkyl group, an aryl group, an alkylaryl group, and a cycloalkyl group, or an alkoxy group; and X represents a halogen, e.g., fluorine, chlorine, bromine, and iodine. Specific examples of such dialkylaluminum monohalides are diethylaluminum monochloride, di-n-butyl monochloride, and diethylaluminum monoiodide. When polymerization is performed by slurry polymerization or bulk polymerization, a combination of the solid product (iii) and the organoaluminum compound would suffice for the polymerization. In cases where polymerization is performed in a gaseous phase, the above-described catalyst of higher activity, i.e., the catalyst preactivated by the reaction with an α-olefin, is desirable. In cases where slurry or bulk polymerization is followed by gaseous phase polymerization, the former catalyst used in the former polymerization becomes the latter catalyst in the gaseous phase polymerization to produce excellent catalytic activity because it undergoes reaction with propylene.

The preactivation is effected by using 0.1 to 500 g, preferably 1 to 100 g of the organoaluminum compound, 0 to 50 l, preferably 3 to 30 l of a solvent, 0 to 1,000 ml, preferably 0 to 300 ml of hydrogen, and 0.05 to 5,000 g, preferably 0.05 to 3,000 g of an α-olefin each per gram of the solid product (iii), and the reaction is carried out at a temperature of from 0° to 100° C., preferably from 5° to 50° C. for 1 minute to 20 hours, preferably 10 minutes to 10 hours to react 0.01 to 2,000 g, preferably 0.05 to 200 g of the α-olefin per gram of the solid product (iii).

The reaction with the α-olefin for preactivation may be performed either in an aliphatic hydrocarbon or aromatic compound solvent or in a liquefied α-olefin, e.g., liquefied propylene and liquefied butene-1, in the absence of a solvent. Ethylene, propylene, etc. may be reacted in a gaseous phase. The reaction may also be effected in the presence of a previously prepared α-olefin polymer or hydrogen.

Implicit in the mode of preactivation are various embodiments, such as (a) a method in which an α-olefin is brought into contact with a combination of the solid product (iii) and the organoaluminum compound to effect slurry reaction, bulk reaction or gaseous phase reaction; (b) a method in which the solid product (iii) and the organoaluminum compound are combined in the presence of an α-olefin; (c) a method according to the method (a) or (b) which is carried out in the presence of an α-olefin polymer; and (d) a method according to the method (a), (b), or (c) which is carried out in the presence of hydrogen. It is possible to add an aromatic carboxylic ester (v) hereinafter described to the preactivation system.

The α-olefin to be used for preactivation includes straight chain monoolefins, e.g., ethylene, propylene, butene-1, hexene-1, and heptene-1; branched chain monoolefins, e.g., 4-methyl-pentene-1, 2-methyl-pentene- 1, and 3-methylbutene-1; and styrene. The α-olefin for preactivation and that for the above-described α-olefin polymer may be the same or different. Further, these α-olefins may be used either individually or in combinations thereof.

After completion of the preactivation, the solvent, organoaluminum compound, and unreacted α-olefin are removed from the reaction mixture, for example, by distillation under reduced pressure, filtration, or decantation, and the residue is dried to obtain a dry powder for use in the polymerization. Alternatively, the reaction mixture may be used as it is as long as the amount of the solvent in which the solid product (iii) is suspended does not exceed 80 l, preferably from 0.1 to 10 l, per gram of the solid product. The organoaluminum compound may be added before polymerization.

The thus preactivated catalyst may be used for slurry polymerization of propylene which is conducted in a hydrocarbon solvent (e.g., n-hexane, n-heptane, n-octane, benzene, toluene) or bulk polymerization or gaseous phase polymerization of propylene which is conducted in liquefied propylene. However, in order to increase isotacticity of the resulting propylene polymer, it is necessary to add an aromatic carboxylic acid ester (v) (hereinafter referred to as aromatic ester) at a (v)/(iii) molar ratio of from 0.1 to 10.0, preferably from 0.2 to 5. If the (v)/(iii) molar ratio is too small, an appreciable improvement on isotacticity cannot be achieved. If it is too large, the catalytic activity would be unacceptably reduced.

Specific examples of the aromatic ester include ethyl benzoate, propyl benzoate, butyl benzoate, octyl benzoate, 2-ethylhexyl benzoate, methyl toluylate, ethyl toluylate, 2-ethylhexyl toluylate, methyl anisate, ethyl anisate, propyl anisate, ethyl cinnamate, methyl naphthoate, propyl naphthoate, butyl naphthoate, 2-ethylhexyl naphthoate, and ethyl phenylacetate.

The organoaluminum compound (iv) and the solid product (iii) are used in such amounts that the molar ratio of aluminum to titanium (Al/Ti) may fall within a range of from 0.1 to 100, preferably from 1 to 20. The mole number of the solid product (iii) as referred to is substantially the same as the gram atom number of Ti in the solid product (iii).

Crystallinity of polypropylene which manifests the effects of the present invention can be specified by a relationship between an isotactic pentad ratio of the total polymer (P) and an MFR of the total polymer. Such a relationship preferably satisfies formula:

$$1 \geq P \geq 0.015 \log MFR + 0.955$$

According as the MFR increases, P tends to increase. The MFR recommended for practical use usually ranges from about 0.05 to 100 g/10 min, preferably from about 0.1 to 50 g/10 min.

The polypropylene polymerization is usually carried out at a temperature of from 20° to 100° C., preferably from 40° to 85° C., under a pressure of from normal pressure to 50 kg/cm²G, preferably from 5 to 40 kg/cm²G for about 0.5 to 15 hours, preferably 2 to 12 hours. If the polymerization temperature is too low, the catalytic activity would be insufficient for practical use. Too a high temperature makes it difficult to increase isotacticity. During the polymerization, a proper amount of hydrogen may be fed to the system for molecular weight control as is usual in the conventional techniques.

The process of the present invention is further characterized in that the polymerization of propylene is effected in multiple stages while controlling the isotacticity and the molecular weight distribution of the polymer produced by adding a smaller amount of the aromatic ester for the production of a polymer portion having a higher MFR (i.e., lower molecular weight) and by adding an increased amount of the aromatic ester for the production of a polymer portion having a lower MFR (i.e., higher molecular weight). Polypropylene of high stiffness can thus be obtained without inducing considerable reduction of the catalytic activity.

The high stiffness polypropylene according to the present invention is widely applicable and effective in the field of various molding techniques. For example, in the field of injection molding, it is suitable for use in broadened applications where high stiffness polymers, e.g., polystyrene and ABS, have hitherto been employed. Further, the high stiffness of the polypropylene of the invention not only brings about improved quality of molded articles obtained therefrom but makes it possible to reduce the wall thickness of the molded articles. Accordingly, the high stiffness polypropylene of the invention is expected to contribute to saving of resources and to speeding up of molding, which would lead to cost reduction.

The process of the present invention can produce polypropylene whose stiffness is improved over any conventional propylene polymers produced by using a nucleating agent or an inorganic filler in combination. In cases in which stiffness on the same level as the conventional products is enough for the end use, the requisite amount of the resin can be reduced.

In the film industry, the present invention similarly favors improved workability in automatic packaging attributed to the improved stiffness and reduction of cost attributed to reduction of the wall thickness.

The present invention is now illustrated in greater detail with reference to Examples, Comparative Examples, and Preparation Examples, but it should be understood that the present invention is not construed as being limited thereto. In these examples, all the parts and percents are by weight unless otherwise indicated.

Various physical properties of propylene polymers obtained in examples and molded articles prepared therefrom were measured according to the following test methods or standards.

1) Physical Properties of Injection Molded Article:
   a) Flexural Modulus (kgf/cm$^2$): JIS K 6758 (23° C. or 80° C.)
   b) Flexural Strength (kgf/cm$^2$): JIS K 6758 (23° C. or 80° C.)
   c) Tensile Strength (kgf/cm$^2$): JIS K 6758
   d) Rockwell Hardness: JIS K 6758 (R scale)
   e) Heat Distortion Temperature (HDT) (°C.): JIS K 7202

2) Physical Properties of Film Article:
   f) Young's Modulus (kgf/mm$^2$): ASTM D 888
   g) Tensile Yield Strength (kgf/mm$^2$): ASTM D 882 f) and g) were expressed as averages in the transverse direction (TD) and in the machine direction (MD).

3) MFR (g/10 min): ASTM D-1238, 230° C., 2.16 kg

4) Isotactic Pentad Ratio (P):

An isotactic ratio in pentad unit of the polypropylene molecular chain was determined by the method of *Macromolecules*, Vol. 8, p. 687 (1975), using $^{13}$C-NMR.

EXAMPLE 1

1) Preparation of Catalyst:

n-Hexane (600 ml), 0.50 mol of diethylaluminum monochloride (DEAC), and 1.20 mol of diisoamyl ether were mixed at 25° C. for 1 minute, and the mixture was allowed to react at that temperature for 5 minutes to obtain a reaction mixture (vi) (diisoamyl ether/DEAC molar ratio= 2.4). In a reactor whose atmosphere had been replaced with nitrogen was put 4.0 mols of titanium tetrachloride and heated to 35° C. The whole amount of the reaction mixture (vi) was added thereto dropwise over a period of 180 minutes. The mixture was kept at 35° C. for 30 minutes and then heated up to 75° C. at which temperature the reaction was further continued for an additional 1 hour. After cooling to room temperature (20° C.), the supernatant liquor was removed, and 4,000 ml of n-hexane was added to the residue, followed by decantation to remove the supernatant. The addition of n-hexane and the subsequent decantation were repeated four times to obtain 190 g of a solid product (ii). The whole amount of the solid product (ii) was suspended in 3,000 ml of n-hexane, and to the suspension was added 160 g of diisoamyl ether at 20° C., and then 350 g of titanium tetrachloride was added thereto at room temperature over about 1 minute, followed by allowing the mixture to react at 65° C. for 1 hour. After completion of the reaction, the reaction mixture was cooled to room temperature, and the supernatant liquor was removed by decantation. To the residue was added 4,000 ml of n-hexane, the mixture stirred for 10 minutes, followed by allowing it to stand, and the supernatant removed by decantation. The addition of n-hexane and the decantation were repeated five times, and the final residue was dried under reduced pressure to obtain a solid product (iii).

2) Preparation of Preactivated Catalyst:

In a 20 l-volume stainless steel reactor equipped with tilted wings whose atmosphere had been displaced with nitrogen gas were added 15 l of n-hexane, 42 g of diethylaluminum monochloride, and 30 g of the solid product (iii) prepared in 1) above at room temperature, and 15 Nl of hydrogen was introduced therein, followed by reacting for 5 minutes at a propylene partial pressure of 5 kg/cm²G. The unreacted propylene, hydrogen, and n-hexane were removed under reduced pressure to obtain a preactivated catalyst (vii) as a powder[propylene reaction weight: 82.0 g per gram of the solid product (iii)].

3) Polymerization of Propylene:

In a 250 l-volume stainless steel polymerization vessel equipped with a turbine impeller mixer whose atmosphere had been displaced with nitrogen were charged 100 l of n-hexane and then 10 g of diethylaluminum monochloride, 10 g of the preactivated catalyst (vii) prepared in 2) above, and 5.5 g of methyl p-toluate as an aromatic ester. To the vessel was further added 300 Nl of hydrogen. After the temperature was elevated to 70° C., propylene was fed thereto to elevate the total pressure to 10 kg/cm²G. The polymerization of a first stage was effected for 1 hour while maintaining the temperature at 70° C. and the pressure at 10 kg/cm²G. The propylene feed was stopped, and the reaction mixture was cooled to room temperature, and hydrogen and the unreacted propylene were driven out of the reaction vessel. A part of the polymerization slurry was withdrawn and determined for $MFR_1$, and a titanium content was determined by X-ray fluorometry to obtain a polymer yield per unit weight of the catalyst.

Then, 5.5 g of methyl p-toluate was additionally charged in the vessel, and 160 Nl of hydrogen was added thereto. After the inner temperature was again elevated to 70° C., propylene was fed to effect polymerization of a second stage for 1 hour while maintaining the total pressure at 10 kg/cm²G. The propylene feed was stopped, the temperature decreased to room temperature, and hydrogen and the unreacted propylene released. A part of the polymerization slurry was withdrawn to determine the MFR and the polymer yield per unit weight of the catalyst in the same manner as described above.

A weight ratio of the polymer portion produced in the first stage to that produced in the second stage was calculated from the respective polymer yields.

The MFR of the polymer portion produced in the second stage was calculated by substituting the MFR of the polymer portion produced in the first stage and the MFR of the total polymer in equation:

$$\log MFR = x\log MFR_1 + (1-x) \log MFR_2$$

wherein x is a polymerization ratio of the first stage; MFR is an MFR of the polymer obtained after completion of the second stage; and $MFR_1$ and $MFR_2$ are each is an MFR of the polymer portion produced in the first or second stage, respectively.

Then, 22 g of methyl p-toluate was added to the reaction vessel, 80 Nl of hydrogen introduced, the temperature elevated to 70° C., propylene fed, and polymerization of a third stage effected for 1 hour while maintaining the total pressure at 10 kg/cm²G. After the propylene feed was stopped, the inner temperature was decreased to room temperature, and hydrogen and the unreacted propylene were released. A part of the polymerization slurry was taken out and determined for $MFR_T$ and the polymer yield per unit weight of the catalyst in the same manner as described above.

The polymerization ratios of the first, second and third stages were calculated from the polymer yields of the first and second stages. The MFR of the polymer portion produced in the third stage ($MFR_3$) was obtained from equation:

$$\log MFR_T = x_1 \log MFR_1 + x_2 \log MFR_2 + x_3 \log MFR_3$$

wherein $x_1$, $x_2$ and $x_3$ each represents a polymerization ratio of the first, second, and third stages, respectively; $MFR_1$, $MFR_2$, and $MFR_3$ each represents an MFR of the polymer portion produced in the first, second, and third stages, respectively.

To the slurry was added 25 l of methanol, followed by stirring at 90° C. for 30 minutes, and 100 ml of a 20% aqueous solution of sodium hydroxide was added thereto, followed by stirring for 20 minutes. After cooling to room temperature, the slurry was washed with 50 l of water three times, filtered, and dried to obtain a white polymer powder.

4) Preparation of Injection Molded Article:

To 4.0 kg of the polypropylene powder obtained in 3) above were added 0.004 kg of a phenolic heat stabilizer, and 0.004 kg of calcium stearate, and the mixture was mixed in a Henschel mixer at room temperature for 10 minutes. The mixture was pelletized by means of a twin-screw extrusion pelletizer having a diameter of 40 mm.

The pellets were injection molded in an injection molding machine at a molten resin temperature of 230° C. and a mold temperature of 50° C. to prepare various specimens according to JIS (Japanese Industrial Standard). After conditioning in a thermo-hygrostat kept at 23° C. and 50% RH for 72 hours, the specimens were subjected to measurements of flexural modulus, flexural strength, tensile strength, hardness, and heat distortion temperature (HDT). In the measurements of flexural modulus and flexural strength at 80° C., the specimens were tested after they were allowed to stand in an atmosphere of 80° C. for 20 minutes. The results obtained are shown in Table 1 below.

EXAMPLES 2 AND 3

Polypropylene was obtained as a white powder in the same manner as in Example 1, with the exception that the amounts of hydrogen fed in the first, second, and third stages as used in Example 1 (300 Nl, 150 Nl, and 80 Nl, respectively) were changed to 500 Nl, 400 Nl, and 150 Nl, respectively, in Example 2; or 700 Nl, 700 Nl, and 300 Nl, respectively, in Example 3.

Injection-molded specimens were prepared from each of the resulting polymer powders and various physical properties were determined in the same manner as in Example 1. The results obtained are shown in Table 1.

COMPARATIVE EXAMPLES 1 AND 2

Propylene was polymerized in the same manner as in the first stage of Example 1, except that the polymerization was carried out for 3 hours, 50 Nl (Comparative Example 1) or 150 Nl (Comparative Example 2) of hydrogen was added, no aromatic ester was used, and 5 g of the preactivated catalyst (vii) was used.

Injection-molded specimens were prepared from each of the resulting polymer powders and determined for physical properties in the same manner as in Example 1. The results obtained are shown in Table 1.

It can be seen from Table 1 that the injection-molded article obtained from the polypropylene of Comparative Example 1 or 2 was considerably inferior to those obtained in Examples 1 to 3 in various strengths, hardness and HDT.

COMPARATIVE EXAMPLES 3 TO 5

Propylene was polymerized in the same manner as in the first stage of Example 1, except that the polymerization was carried out for 3 hours, 150 Nl (Comparative Example 3), 300 Nl (Comparative Example 4), or 500 Nl (Comparative Example 5) of hydrogen was added, and 11 g (Comparative Example 3), 11 g (Comparative Example 4), or 55 g (Comparative Example 5) of methyl p-toluate was added.

Injection-molded speciments were prepared from each of the resulting polymer powders and determined for various physical properties in the same manner as in Example 1. The results obtained are shown in Table 1.

Upon consideration of the results of Table 1, it is noted that addition of the aromatic ester at the time of polymerization brings about an improvement in stiffness of injection-molded articles, but an increase of the amount of the aromatic ester to be added is impractical because it leads to a drop of the poly-propylene yield.

For better understanding, physical properties of an ABS resin and a polystyrene resin are shown in Table 1.

COMPARATIVE EXAMPLE 6

Propylene was polymerized in the same manner as in Example 1, except for adding methyl p-toluate only in the first stage in an amount of 11 g and adding 350 Nl, 120 Nl, and 60 Nl of hydrogen in the first, second, and third stages, respectively.

Injection-molded specimens were prepared from the resulting polymer powder and determined for various physical properties in the same manner as in Example 1. The results obtained are shown in Table 1.

TABLE 1

|  | Ex. 1 | Ex. 2 | Ex. 3 | Compa. Ex. 1 | Compa. Ex. 2 | Compa. Ex. 3 |
|---|---|---|---|---|---|---|
| 1st Stage Polymerization: | | | | | | |
| (v)/(iii) Molar Ratio* | 0.5 | 0.5 | 0.5 | 0.0 | 0.0 | 1.0 |
| Polymerization Ratio (wt %) | 39 | 41 | 40 | 100 | 100 | 100 |
| $MFR_1$ | 32 | 85.0 | 152 | 2.0 | 21.4 | 1.9 |
| 2nd Stage Polymerization: | | | | | | |
| (v)/(iii) Molar Ratio* | 1.0 | 1.0 | 1.0 | — | — | — |
| Polymerization Ratio (wt %) | 36 | 35 | 33 | — | — | — |
| $MFR_2$ | 3.0 | 18.0 | 55.0 | — | — | — |
| 3rd Stage Polymerization: | | | | | | |
| (v)/(iii) Molar Ratio* | 3.0 | 3.0 | 3.0 | — | — | — |
| Polymerization Ratio (wt %) | 25 | 24 | 27 | — | — | — |
| $MFR_3$ | 0.01 | 0.05 | 0.25 | — | — | — |
| Total Polymer: | | | | | | |
| Polypropylene Yield (kg) | 48.5 | 45.5 | 41.0 | 39.0 | 36.5 | 47.5 |
| $MFR_T$ | 1.8 | 8.3 | 19.3 | 2.0 | 21.4 | 1.9 |
| $logMFR_1/MFR_2$ | 1.0 | 0.67 | 0.44 | — | — | — |
| $logMFR_1/MFR_3$ | 3.5 | 3.2 | 2.8 | — | — | — |
| Isotactic Pentad Ratio (P) | 0.986 | 0.992 | 0.993 | 0.922 | 0.940 | 0.972 |
| Injection-Molded Article: | | | | | | |
| Flexural Modulus at 23° C. | 18600 | 19700 | 21000 | 12400 | 14500 | 17200 |
| Flexural Modulus at 80° C. | 7800 | 8300 | 8500 | 4500 | 4600 | 5100 |
| Flexural Strength at 23° C. | 480 | 492 | 498 | 368 | 391 | 465 |
| Flexural Strength at 80° C. | 234 | 245 | 247 | 150 | 156 | 171 |
| Tensile Strength | 374 | 382 | 386 | 329 | 346 | 370 |
| Hardness | 115 | 116 | 117 | 101 | 104 | 111 |
| HDT | 120 | 125 | 128 | 102 | 106 | 118 |

|  | Compa. Ex. 4 | Compa. Ex. 5 | Compa. Ex. 6 | Ref. Ex.** ABS | Ref. Ex.** PS |
|---|---|---|---|---|---|
| 1st Stage Polymerization: | | | | | |
| (v)/(iii) Molar Ratio* | 1.0 | 5.0 | 1.0 | | |
| Polymerization Ratio (wt %) | 100 | 100 | 41 | | |

TABLE 1-continued

| | | | | | |
|---|---|---|---|---|---|
| MFR$_1$ | 18.3 | 9.9 | 33 | | |
| 2nd Stage Polymerization: | | | | | |
| (v)/(iii) Molar Ratio* | — | — | 1.0 | | |
| Polymerization Ratio (wt %) | — | — | 35 | | |
| MFR$_2$ | — | — | 2.8 | | |
| 3rd Stage Polymerization: | | | | | |
| (v)/(iii) Molar Ratio* | — | — | 1.0 | | |
| Polymerization Ratio (wt %) | — | — | 24 | | |
| MFR$_3$ | — | — | 0.06 | | |
| Total Polymer: | | | | | |
| Polypropylene Yield (kg) | 40.5 | 10.0 | 46.0 | | |
| MFR$_T$ | 18.3 | 9.9 | 2.0 | | |
| logMFR$_1$/MFR$_2$ | — | — | 1.1 | | |
| logMFR$_1$/MFR$_3$ | — | — | 2.7 | | |
| Isotactic Pentad Ratio (P) | 0.990 | 0.990 | 0.968 | | |
| Injection-Molded Article: | | | | | |
| Flexural Modulus at 23° C. | 19000 | 19100 | 17400 | 14000–32000 | 22000–35000 |
| Flexural Modulus at 80° C. | 5400 | 5400 | 5700 | | |
| Flexural Strength at 23° C. | 485 | 486 | 466 | — | — |
| Flexural Strength at 80° C. | 177 | 178 | 186 | — | — |
| Tensile Strength | 376 | 376 | 370 | — | — |
| Hardness | 115 | 115 | 112 | 75–115 | 50–120 |
| HDT | 120 | 121 | 118 | 98–120 | — |

Note:
*Molar ratio of aromatic ester (methyl p-toluate) to solid product.
**Reference: Modern Plastic Encyclopedia (1968)

EXAMPLES 4 TO 6

Propylene was polymerized in the same manner as in Example 1, except for changing the molar ratio of the methyl p-toluate (aromatic ester) to the solid product (iii) as shown in Table 2, changing the amount of hydrogen to be fed in the first, second, and third stages to 400 Nl, 250 Nl, and 30 Nl, respectively (Example 4), or 800 Nl, 700 Nl, and 400 Nl, respectively (Example 5), or 1500 Nl, 1200 Nl, and 900 Nl, respectively (Example 6), and changing the amount of methyl p-toluate to be added in the first, second, and third stages to 1.1 g, 4.4 g, and 5.5 g, respectively (Example 4), or 11 g, 1t g, and 22 g, respectively (Example 5), or 22 g, 33 g, and 55 g, respectively (Example 6).

Injection-molded specimens were prepared from each of the resulting polymer powders and determined for various physical properties in the same manner as in Example 1. The results obtained are shown in Table 2.

COMPARATIVE EXAMPLES 7 TO 9

Propylene was polymerized in the same manner as in Example 1, except for changing the amount of hydrogen to be added in the first, second, and third stages to 350 Nl, 150 Nl, and 50 Nl, respectively, changing the amount of the preactivated catalyst (vii) to 5 g, and using no aromatic ester in Comparative Example 7; changing the amount of hydrogen to be added in the first, second, and third stages to 380 Nl, 170 Nl, and 70 Nl, respectively, changing the amount of the preactivated catalyst (vii) to 5 g, and changing the amount of methyl p-toluate to be added to the first, second, and third stages to 0.22 g, 0.33 g, and 0.22 g, respectively, in Comparative Example 8; or changing the amount of hydrogen to be added in the first, second, and third stages to 5000 Nl, 4000 Nl, and 2000 Nl, respectively, and changing the amount of methyl p-toluate to be added in the first, second, and third stages to 121 g, 44 g, and 33 g, respectively, in Comparative Example 9.

Injection-molded specimens were prepared from each of the resulting polymer powders and determined for physical properties in the same manner as in Example 1. The results obtained are shown in Table 2.

The process of Comparative Examples 7 to 9 bears similarly on the process of the present invention in using a combination of a solid product (iii) and an organoaluminum compound. However, as is apparent from Table 2, since no aromatic ester is used or the aromatic ester/solid product molar ratio is outside the scope of the present invention in the comparative examples, the polypropylene cannot provide molded articles having sufficient stiffness. In Comparative Example 9, measurements of physical properties could not be made because the polymer yield was too low.

TABLE 2

|  | Example 4 | Example 5 | Example 6 | Comparative Example 7 | Comparative Example 8 | Comparative Example 9 |
|---|---|---|---|---|---|---|
| 1st Stage Polymerization: | | | | | | |
| (v)/(iii) Molar Ratio* | 0.1 | 1.0 | 2.0 | 0 | 0.02 | 11 |
| Polymerization Ratio (wt %) | 40 | 38 | 42 | 41 | 38 | 39 |
| $MFR_1$ | 92 | 81.0 | 86.2 | 85 | 95 | 88 |
| 2nd Stage Polymerization: | | | | | | |
| (V)/(iii) Molar Ratio* | 0.5 | 2.0 | 5.0 | 0 | 0.05 | 15 |
| Polymerization Ratio (wt %) | 32 | 38 | 36 | 34 | 33 | 36 |
| $MFR_2$ | 18.6 | 18.0 | 11.9 | 15.5 | 17.8 | 14.5 |
| 3rd Stage Polymerization: | | | | | | |
| (v)/(iii) Molar Ratio* | 1.0 | 4.0 | 10.0 | 0 | 0.07 | 18 |
| Polymerization Ratio (wt %) | 28 | 24 | 22 | 25 | 29 | 25 |
| $MFR_3$ | 0.06 | 0.05 | 0.04 | 0.045 | 0.07 | 0.055 |
| Total Polymer: | | | | | | |
| Polypropylene Yield (kg) | 55.0 | 37.5 | 15.5 | 41.5 | 39.0 | 2.0 |
| $MFR_T$ | 7.1 | 6.9 | 7.8 | 7.2 | 6.7 | 7.3 |
| $\log MFR_1/MFR_2$ | 0.69 | 0.79 | 0.86 | 0.74 | 0.73 | 0.78 |
| $\log MFR_1/MFR_3$ | 3.2 | 3.2 | 3.3 | 3.3 | 3.1 | 3.2 |
| Isotactic Pentad Ratio (P) | 0.980 | 0.992 | 0.993 | 0.924 | 0.930 | 0.981 |
| Injection-Molded Article: | | | | | | |
| Flexural Modulus at 23° C. | 18000 | 21000 | 20500 | 13500 | 14000 | — |
| Flexural Modulus at 80° C. | 7500 | 8300 | 8200 | 4400 | 4500 | — |
| Flexural Strength at 23° C. | 465 | 500 | 495 | 390 | 400 | — |
| Flexural Strength at 80° C. | 226 | 239 | 240 | 152 | 155 | — |
| Tensile Strength | 370 | 390 | 386 | 338 | 340 | — |
| Hardness | 113 | 117 | 116 | 103 | 103 | — |
| HDT | 117 | 128 | 126 | 105 | 106 | — |

Note:
*Molar ratio of aromatic ester (methyl p-toluate) to solid product.

EXAMPLES 7 TO 9 AND COMPARATIVE EXAMPLE 10

Propylene was polymerized in the same manner as in Example 1, except that 150 Nl, 150 Nl, and 70 Nl of hydrogen were added in the first, second, and third stages, respectively, in Example 7; 450 Nl, 180 Nl, and 60 Nl of hydrogen were added in the first, second, and third stages, respectively, in Example 8; 700 Nl, 400 Nl, and 20 Nl of hydrogen were added in the first, second, and third stages, respectively, in Example 9; or 1000 Nl, 600 Nl, and 5 Nl of hydrogen were added in the first, second, and third stages, respectively, in Comparative Example 10.

Injection-molded specimens were prepared from each of the resulting polymer powders and determined for various physical properties in the same manner as in Example 1. The results obtained are shown in Table 3.

As is apparent from Table 3, a greater improvement on stiffness could be obtained as the ratio $\log MFR_1/MFR_3$ ($\log MFR_H/MFR_L$) increased. In Comparative Example 10, however, the polypropylene yield per unit catalyst was impractically low because the $\log MFR_H/MFR_L$ was out of the scope of the present invention.

TABLE 3

|  | Example 7 | Example 8 | Example 9 | Comparative Example 10 |
|---|---|---|---|---|
| 1st Stage Polymerization: | | | | |
| (v)/(iii) Molar Ratio* | 0.5 | 0.5 | 0.5 | 0.5 |
| Polymerization Ratio (wt %) | 38 | 36 | 33 | 30 |
| $MFR_1$ | 10.2 | 72 | 150 | 300 |
| 2nd Stage Polymerization: | | | | |
| (v)/(iii) Molar Ratio* | 1.0 | 1.0 | 1.0 | 1.0 |
| Polymerization Ratio (wt %) | 33 | 34 | 36 | 39 |
| $MFR_2$ | 3.4 | 4.2 | 20.5 | 40 |
| 3rd Stage Polymerization: | | | | |

TABLE 3-continued

|  | Example 7 | Example 8 | Example 9 | Comparative Example 10 |
|---|---|---|---|---|
| (v)/(iii) Molar Ratio* | 3.0 | 3.0 | 3.0 | 3.0 |
| Polymerization Ratio (wt %) | 29 | 30 | 31 | 31 |
| $MFR_3$ | 0.41 | 0.025 | 0.0028 | 0.00065 |
| Total Polymer: |  |  |  |  |
| Polypropylene Yield (kg) | 44.5 | 41.5 | 35.5 | 11.0 |
| $MFR_T$ | 2.8 | 2.5 | 2.6 | 2.4 |
| $logMFR_1/MFR_2$ | 0.47 | 1.2 | 0.86 | 0.87 |
| $logMFR_1/MFR_3$ | 1.4 | 3.5 | 4.7 | 5.7 |
| Isotactic Pentad Ratio (P) | 0.980 | 0.990 | 0.991 | 0.991 |
| Injection-Molded Article: |  |  |  |  |
| Flexural Modulus at 23° C. | 18500 | 19200 | 19300 | 18600 |
| Flexural Modulus at 80° C. | 7700 | 8100 | 8200 | 7500 |
| Flexural Strength at 23° C. | 480 | 487 | 488 | 483 |
| Flexural Strength at 80° C. | 229 | 235 | 236 | 225 |
| Tensile Strength | 368 | 378 | 380 | 370 |
| Hardness | 112 | 115 | 115 | 113 |
| HDT | 120 | 123 | 123 | 121 |

Note:
*Molar ratio of aromatic ester (methyl p-toluate) to solid product.

EXAMPLE 10

Propylene was polymerized in the same manner as in Example 1, except for replacing the preactivated catalyst (vii) with the solid product (iii).

Injection-molded specimens were prepared from the resulting polypropylene powder and determined for various physical properties in the same manner as in Example 1. The results obtained are shown in Table 4.

EXAMPLE 11

To a mixture of 1200 ml of n-hexane and 300 ml of titanium tetrachloride was added dropwise a solution consisting of 340 ml of DEAC and 900 ml of n-hexane over a period of 4.5 hours at 1° C. while stirring. After the addition, the stirring was continued for an additional period of 15 minutes. The temperature was elevated to 23° C. over 1 hour and then to 65° C. over 30 minutes, at which the stirring was continued for 1 hour. The thus formed solid product (ii) was collected by filtration and dispersed in 1000 ml of n-hexane, followed by decantation. The washing with n-hexane and the subsequent decantation were repeated 5 times. The finally obtained solid product (ii) was dispersed in 3000 ml of hexane, and 480 ml of diisoamyl ether was added thereto, followed by heating at 35° C. for 1 hour while stirring. The resulting solid was separated from the liquid portion and dispersed in a mixed solution consisting of 1000 ml of n-hexane and 700 ml of titanium tetrachloride. The mixture was stirred at 65° C. for 2 hours, followed by filtration to obtain a solid product (iii). The solid was washed with 1000 ml portions of n-hexane 4 times and finally with 1000 ml of n-hexane heated at 65° C., filtered, and dried to obtain a solid product (iii).

Propylene was polymerized in the same manner as in Example 1, except for using the resulting solid product (iii) in place of the preactivated catalyst (vii) as used in Example 1.

Injection-molded specimens were prepared from the resulting polymer powder and determined for various physical properties in the same manner as in Example 1. The results obtained are shown in Table 4.

EXAMPLES 12 TO 14

Propylene was polymerized in the same manner as in Example 1, except for replacing DEAC as used in Example 1 with di-n-propylaluminum monochloride (Example 12), di-i-butylaluminum monochloride (Example 13), or diethylaluminum monoiodide (Example 14).

Injection-molded specimens were prepared from each of the resulting polymer powders and determined for various physical properties in the same manner as in Example 1. The results obtained are shown in Table 4.

EXAMPLES 15 TO 20

Propylene was polymerized in the same manner as in Example 1, except for replacing methyl p-toluate as used in Example 1 with an equal amount of ethyl p-toluate (Example 15), butyl p-toluate (Example 16), methyl benzoate (Example 17), ethyl benzoate (Example 18), methyl p-anisate (Example 19), or ethyl p-anisate (Example 20).

Injection-molded specimens were prepared from each of the resulting polymer powders and determined for various physical properties in the same manner as in Example 1. The results obtained are shown in Table 4.

TABLE 4

|  | Ex. 10 | Ex. 11 | Ex. 12 | Ex. 13 | Ex. 14 | Ex. 15 |
|---|---|---|---|---|---|---|
| Aromatic Ester* | MT | MT | MT | MT | MT | ET |
| Organoaluminum Compound** | DEAC | DEAC | DPAC | DBAC | DEAI | DEAC |
| 1st Stage Polymerization: | | | | | | |
| Polymerization Ratio (wt %) | 38 | 36 | 36 | 37 | 35 | 39 |
| $MFR_1$ | 38 | 88 | 148 | 158 | 138 | 92 |
| 2nd Stage Polymerization: | | | | | | |
| Polymerization Ratio (wt %) | 33 | 34 | 32 | 35 | 31 | 32 |
| $MFR_2$ | 4.4 | 18.6 | 52.5 | 62.0 | 55.0 | 21.0 |
| 3rd Stage Polymerization: | | | | | | |
| Polymerization Ratio (wt %) | 29 | 30 | 32 | 28 | 34 | 29 |
| $MFR_3$ | 0.03 | 0.065 | 0.30 | 0.24 | 0.40 | 0.07 |
| Total Polymer: | | | | | | |
| Polypropylene Yield (kg) | 46.5 | 38.0 | 41.0 | 45.5 | 40.0 | 43.5 |
| $MFR_T$ | 2.3 | 6.0 | 14.6 | 18.5 | 14.2 | 7.1 |
| $\log MFR_1/MFR_2$ | 0.94 | 0.67 | 0.45 | 0.41 | 0.40 | 0.64 |
| $\log MFR_1/MFR_3$ | 3.1 | 3.1 | 2.7 | 2.8 | 2.5 | 3.1 |
| Isotactic Pentad Ratio (P) | 0.985 | 0.991 | 0.992 | 0.990 | 0.993 | 0.991 |
| Injection-Molded Article: | | | | | | |
| Flexural Modulus at 23° C. | 18900 | 19400 | 19800 | 19100 | 20800 | 19500 |
| Flexural Modulus at 80° C. | 7600 | 7900 | 8000 | 7800 | 8300 | 7700 |
| Flexural Strength at 23° C. | 485 | 490 | 494 | 487 | 497 | 491 |
| Flexural Strength at 80° C. | 230 | 238 | 239 | 228 | 241 | 238 |
| Tensile Strength | 373 | 376 | 384 | 376 | 386 | 377 |
| Hardness | 114 | 115 | 116 | 115 | 117 | 116 |
| HDT | 122 | 123 | 125 | 123 | 128 | 124 |

|  | Ex. 16 | Ex. 17 | Ex. 18 | Ex. 19 | Ex. 20 |
|---|---|---|---|---|---|
| Aromatic Ester* | BT | MB | EB | MA | EA |
| Organoaluminum Compound** | DEAC | DEAC | DEAC | DEAC | DEAC |
| 1st Stage Polymerization: | | | | | |
| Polymerization Ratio (wt %) | 37 | 34 | 34 | 36 | 37 |
| $MFR_1$ | 88 | 85 | 79 | 91 | 86 |
| 2nd Stage Polymerization: | | | | | |
| Polymerization Ratio (wt %) | 32 | 30 | 33 | 32 | 33 |
| $MFR_2$ | 17.8 | 22.0 | 15.8 | 18.0 | 14.7 |
| 3rd Stage Polymerization: | | | | | |
| Polymerization Ratio (wt %) | 31 | 36 | 33 | 32 | 30 |
| $MFR_3$ | 0.085 | 0.10 | 0.25 | 0.22 | 0.30 |
| Total Polymer: | | | | | |
| Polypropylene Yield (kg) | 39.5 | 30.5 | 32.0 | 45.0 | 46.0 |
| $MFR_T$ | 6.1 | 5.0 | 7.0 | 7.9 | 8.8 |
| $\log MFR_1/MFR_2$ | 0.69 | 0.59 | 0.70 | 0.70 | 0.77 |
| $\log MFR_1/MFR_3$ | 3.0 | 2.9 | 2.5 | 2.6 | 2.5 |
| Isotactic Pentad Ratio (P) | 0.990 | 0.986 | 0.984 | 0.983 | 0.989 |
| Injection-Molded Article: | | | | | |
| Flexural Modulus at 23° C. | 19000 | 18800 | 18600 | 18400 | 18900 |
| Flexural Modulus at 80° C. | 7500 | 7500 | 7300 | 7600 | 7800 |
| Flexural Strength at 23° C. | 486 | 484 | 482 | 480 | 484 |
| Flexural Strength at 80° C. | 226 | 222 | 224 | 223 | 225 |
| Tensile Strength | 375 | 372 | 372 | 370 | 373 |
| Hardness | 115 | 113 | 112 | 112 | 113 |
| HDT | 122 | 123 | 122 | 122 | 124 |

Note:
*MT: Methyl p-toluate
ET: Ethyl p-toluate
BT: Butyl p-toluate
MB: Methyl benzoate
EB: Ethyl benzoate
MA: Methyl p-anisate
EA: Ethyl p-anisate
**DEAC: Diethylaluminum monochloride
DPAC: Di-n-propylaluminum monochloride
DBAC: Di-i-butylaluminum monochloride
DEAI: Diethylaluminum monoiodide

EXAMPLES 21 AND 22

Propylene was polymerized in the same manner as in Example 1, except for changing the molar ratio of aromatic ester (methyl p-toluate) to solid product in Example 22 as shown in Table 5 below.

To 5.0 kg of each of the polymer powder prepared in Example 1 (Example 21) and the above-obtained polymer powder (Example 22) were added 0.005 kg of a phenolic heat stabilizer, 0.005 kg of calcium stearate, and 0.01 kg of a silica fine powder, and the mixture was mixed in a Henschel mixer at room temperature for 10 minutes. The mixture was pelletized in an extrusion pelletizer having a diameter of 40 mm.

The pellets were supplied to a CYT film-forming machine (manufactured by Yamaguchi Seisakusho K.K.) to obtain a blown film having a thickness of 30 μm and a flat width of 150 mm by blown-film extrusion at a die temperature of 215° C. and a cooling water temperature of 20° C. After conditioning in a thermo-hygrostat kept at 23° C. and 50% RH for 72 hours, the film was subjected to measurement of Young's modulus and tensile yield strength. The results obtained are shown in Table 5.

COMPARATIVE EXAMPLES 11 AND 12

Propylene was polymerized in the same manner as in the first stage of Example 1 (70° C., 10 kg/cm$^2$G), except that 100 Nl of hydrogen was added and no aromatic ester was used in Comparative Example 11; or 250 Nl of hydrogen and 11.0 g of methyl p-toluate were added and the amount of the preactivated catalyst (vii) was changed to 5 g in Comparative Example 12; and that the polymerization was continued for 3 hours.

A blown film was prepared from each of the resulting polymer powders and determined for physical properties in the same manner as in Examples 21 and 22. The results obtained are shown in Table 5.

It can be seen from Table 5 that the blown films of Comparative Examples 11 and 12 are considerably inferior to those of Examples 21 and 22 in Young's modulus and tensile yield strength.

TABLE 5

|  | Example 21 | Example 22 | Comparative Example 11 | Comparative Example 12 |
|---|---|---|---|---|
| 1st Stage Polymerization: |  |  |  |  |
| (v)/(iii) Molar Ratio* | 0.5 | 0.1 | 0 | 1.0 |
| Polymerization Ratio (wt %) | 38 | 35 | 100 | 100 |
| MFR$_1$ | 96 | 94 | 7.2 | 7.0 |
| 2nd Stage Polymerization: |  |  |  |  |
| (v)/(iii) Molar Ratio* | 1.0 | 0.5 | — | — |
| Polymerization Ratio (wt %) | 33 | 34 | — | — |
| MFR$_2$ | 19.4 | 22.0 | — | — |
| 3rd Stage Polymerization: |  |  |  |  |
| (v)/(iii) Molar Ratio* | 3.0 | 1.0 | — | — |
| Polymerization Ratio (wt %) | 29 | 31 | — | — |
| MFR$_3$ | 0.065 | 0.080 | — | — |
| Total Polymer: |  |  |  |  |
| Polypropylene Yield (kg) | 43.0 | 48.5 | 53.0 | 38.0 |
| MFR$_T$ | 6.8 | 6.4 | 7.2 | 7.0 |
| logMFR$_1$/MFR$_2$ | 0.69 | 0.63 | — | — |
| logMFR$_1$/MFR$_3$ | 3.2 | 3.1 | — | — |
| Isotactic Pentad Ratio (P) | 0.986 | 0.983 | 0.938 | 0.982 |
| Blown Film: |  |  |  |  |
| Young's Modulus | 110 | 102 | 71 | 98 |
| Tensile Yield Strength | 3.5 | 3.2 | 2.2 | 2.9 |

Note:
*Molar ratio of aromatic ester (methyl p-toluate) to solid product.

EXAMPLE 23

To 5.0 kg of the polymer powder prepared in Example 1 were added 0,005 kg of a phenolic heat stabilizer, 0.005 g of calcium stearate, and 0.0025 kg of a silica ultrafine powder (average particle size: 0.1 μm), and the mixture was mixed in a Henschel mixer at room temperature for 10 minutes and pelletized in an extrusion pelletizer having a diameter of 40 mm. The pellets were extruded in a T-die extruder at a resin temperature of 250° C. and chilled with a chill roll of 20° C. to prepare a 1 mm thick sheet.

The sheet was heated in a hot air at 150° C. for 70 seconds and oriented 7 times at a rate of 5 m/min each in TD and MD to obtain a 20 μm thick oriented film. The physical properties of the oriented film are shown in Table 6.

EXAMPLE 24

Propylene was polymerized in the same manner as in Example 1, except for changing the amounts of hydrogen added in the first, second, and third stages to 550 Nl, 300 Nl, and 100 Nl, respectively.

Five kilograms of the resulting polymer powder were pelletized, extruded, and oriented in the same manner as in Example 23. The physical properties of the resulting oriented film are shown in Table 6.

COMPARATIVE EXAMPLE 13

Propylene was polymerized in the same manner as in Comparative Example 1, and the resulting polymer powder was pelletized, extruded, and oriented in the same manner as in Example 23. The physical properties of the resulting oriented film are shown in Table 6.

COMPARATIVE EXAMPLE 14

Propylene was polymerized in the same manner as in Comparative Example 3, except for adding methyl p-toluate in an amount of 22 g and adding 250 Nl of hydrogen. The resulting polymer powder was pelletized, extruded, and oriented in the same manner as in Example 23. The physical properties of the resulting oriented film are shown in Table 6.

As is apparent from Table 6, the films obtained in Comparative Examples 13 and 14 exhibit satisfactory stretchability but are greatly inferior in Young's modulus and tensile yield strength as compared with the films of Examples 23 and 24.

obtain a first solid product (ii), reacting the resulting first solid product (ii) with said electron donor (a) and an electron acceptor (b) to obtain a second solid product (iii), and combining the resulting second solid product (iii) with a second organoaluminum compound (iv) and an aromatic carboxylic acid ester (v) at a molar ratio of the aromatic carboxylic acid ester to the second solid product (v/iii molar ratio) of from 0.1 to 10.0, in such a manner that from 10 to 90% by weight of the total polymer is produced in a first stage and the balance of the total polymer is produced in a second and any subsequent stages with the v/iii molar ratio of said catalyst being made higher in the second and any subsequent stages than that in the catalyst used in the first stage by adding the aromatic carboxylic acid ester (v) to the polymerization system so as to give 0.1≦v/iii molar ratio≦10, while controlling the melt flow rate (MFR) of a polymer portion produced in each of the first and any subsequent stages so as to satisfy the relationships:

$$0.5 < \log(MFR_H/MFR_L) < 5.0 \quad (1)$$

and

TABLE 6

|  | Example 23 | Example 24 | Comparative Example 13 | Comparative Example 14 |
|---|---|---|---|---|
| 1st Stage Polymerization: | | | | |
| (v)/(iii) Molar Ratio* | 0.5 | 1.0 | 0 | 2.0 |
| Polymerization Ratio (wt %) | 36 | 37 | 100 | 100 |
| MFR$_1$ | 35 | 36 | 1.7 | 1.6 |
| 2nd Stage Polymerization: | | | | |
| (v)/(iii) Molar Ratio* | 1.0 | 2.0 | — | — |
| Polymerization Ratio (wt %) | 33 | 34 | — | — |
| MFR$_2$ | 3.4 | 4.2 | — | — |
| 3rd Stage Polymerization: | | | | |
| (v)/(iii) Molar Ratio* | 3.0 | 4.0 | — | — |
| Polymerization Ratio (wt %) | 31 | 29 | — | — |
| MFR$_3$ | 0.02 | 0.015 | — | — |
| Total Polymer: | | | | |
| Polypropylene Yield (kg) | 44.0 | 28.5 | 41.5 | 24.0 |
| MFR$_T$ | 1.6 | 1.8 | 1.7 | 1.6 |
| logMFR$_1$/MFR$_2$ | 1.0 | 0.93 | — | — |
| logMFR$_1$/MFR$_3$ | 3.2 | 3.4 | — | — |
| Isotactic Pentad Ratio (P) | 0.987 | 0.990 | 0.923 | 0.980 |
| Oriented Film: | | | | |
| Stretchability | good | good | good | good |
| Young's Modulus | 373 | 384 | 200 | 368 |
| Tensile Yield Strength | 255 | 260 | 160 | 250 |

Note:
*Molar ratio of aromatic ester (methyl p-toluate) to solid product.

While the invention has been described in detail and with reference to specific embodiments thereof, it will be apparent to one skilled in the art that various changes and modifications can be made therein without departing from the spirit and scope thereof.

What is claimed is:

1. A process for producing polypropylene which comprises polymerizing propylene in multiple stages, in the presence of a catalyst which is prepared by reacting a first organoaluminum compound (i), or a reaction product (vi) formed between the first organoaluminum compound (i) and an electron donor (a), with titanium tetrachloride (c) to $$0.0028 \leq MFR_L \leq 0.4 \quad (2)$$

wherein MFR$_H$ is the MFR of a polymer portion having the highest MFR and MFR$_L$ is the MFR of a polymer portion having the lowest MFR.

2. A process as claimed in claim 1, wherein the total polymer produced has an MFR ranging from 0.05 to 100 g/10 min.

3. A process as claimed in claim 1, wherein said organoaluminum compound (iv) is a dialkylaluminum monohalide.

4. A process as claimed in claim 1, wherein said catalyst is a preactivated catalyst obtained by reacting a combination of said second solid product (iii) and said organoaluminum compound (iv) with an α-olefin.

5. A process as claimed in claim 1, wherein the polymerization is carried out while controlling the isotactic pentad ratio (P) and the MFR of the total polymer produced so as to satisfy the relationship:

$$1.00 \geq P \geq 0.015 \log MFR + 0.955$$

MFR; and $MFR_L$ is the MFR of a polymer portion having the lowest MFR.

6. A process as claimed in claim 1 wherein said first and second organoaluminum compounds are the same compound.

* * * * *